US012613746B2

(12) United States Patent
Singhal et al.

(10) Patent No.:  US 12,613,746 B2
(45) Date of Patent:      Apr. 28, 2026

(54) DYNAMIC APPLICATION STORAGE ALLOCATION

(71) Applicant: Adobe Inc., San Jose, CA (US)

(72) Inventors: Gourav Singhal, Delhi (IN); Pankaj Goyal, Delhi (IN); Mohit Agarwal, New Delhi (IN); Harish Jalandra, Faridabad (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 463 days.

(21) Appl. No.: 18/105,437

(22) Filed: Feb. 3, 2023

(65) Prior Publication Data

US 2024/0264866 A1      Aug. 8, 2024

(51) Int. Cl.
*G06F 9/46*          (2006.01)
*G06F 9/50*          (2006.01)

(52) U.S. Cl.
CPC .......... *G06F 9/5016* (2013.01); *G06F 9/5022* (2013.01); *G06F 9/5033* (2013.01)

(58) Field of Classification Search
CPC ..... G06F 9/5016; G06F 9/5022; G06F 9/5033
See application file for complete search history.

(56) References Cited

U.S. PATENT DOCUMENTS 8,996,796 B1 *    3/2015   Karamcheti ........ G06F 11/1451
                                                            711/159
2018/0027051 A1 *  1/2018   Parees ....................... G06F 8/71
                                                            709/217

2018/0352091 A1 *  12/2018  Puri .................... H04M 7/0036
2023/0297414 A1 *  9/2023   Chen ................. H04W 52/0264
                                                            718/102

OTHER PUBLICATIONS

Bessani, Alysson , et al., "SCFS: a shared cloud-backed file system", USENIX ATC'14: Proceedings of the 2014 USENIX conference on USENIX Annual Technical Conference [retrieved Nov. 10, 2022]. Retrieved from the Internet <https://www.inesc-id.pt/ficheiros/publicacoes/10382.pdf>., Jun. 19, 2014, 12 Pages.

(Continued)

*Primary Examiner* — Gregory A Kessler
(74) *Attorney, Agent, or Firm* — FIG. 1 Patents

(57)                    ABSTRACT

A storage management system is described that calculates a dynamic cache limit for a computing device application on an application-specific basis. The storage management system calculates the dynamic cache limit automatically and independent of user input, based on usage of the application at a computing device, conditions of the computing device, or a combination thereof. Example parameters considered in computing the dynamic cache limit include usage frequency of the application, minimum data retention requirements for the application, available computing device storage, a storage consumption rate of the application, storage consumption by the application relative to at least one other application, size of digital content created or consumed by the application, data download frequency, frequently used digital content, and so forth. The dynamic cache limit is periodically modified and enforced to prevent an application from consuming more computing device storage than permitted by the dynamic cache limit.

20 Claims, 6 Drawing Sheets

(56)  References Cited

OTHER PUBLICATIONS

Cobbs, Archie , et al., "s3backer", GitHub, Inc., Uploaded by archiecobbs [retrieved Nov. 10, 2022]. Retrieved from the Internet <https://github.com/archiecobbs/s3backer>., Jul. 2022, 5 Pages.

Dong, Yuan , et al., "RFS: a network file system for mobile devices and the cloud", ACM SIGOPS Operating Systems Review, vol. 45, No. 1 [retrieved Nov. 15, 2022]. Retrieved from the Internet <https://doi.org/10.1145/1945023.1945036>., Feb. 18, 2011, 11 Pages.

Klein, Matt , "How to Clear Your Dropbox Cache on Android and iOS", How-to Geek [retrieved Nov. 10, 2022]. Retrieved from the Internet <https://www.howtogeek.com/297840/how-to-clear-your-dropbox-cache-on-android-and-ios/>., Mar. 13, 2017, 10 Pages.

S3FS-FUSE , "s3fs-fuse", GitHub Inc., Uploaded by s3fs-fuse [retrieved Nov. 10, 2022]. Retrieved from the Internet <https://github.com/s3fs-fuse/s3fs-fuse>., Jul. 2020, 6 Pages.

Vrable, Michael , et al., "BlueSky: a cloud-backed file system for the enterprise", FAST'12: Proceedings of the 10th USENIX conference on File and Storage Technologies [retrieved Nov. 10, 2022]. Retrieved from the Internet <https://www.usenix.org/legacy/events/fast12/tech/full_papers/Vrable.pdf>., Feb. 14, 2012, 14 Pages.

* cited by examiner

100

116

118

Network
120

Computing Device 102

Storage 104

Application Data 106

Install Data 108     Metadata 110

Cache 112

Digital Content 114

Storage Management System 122

Dynamic Cache Limit 124

300

400

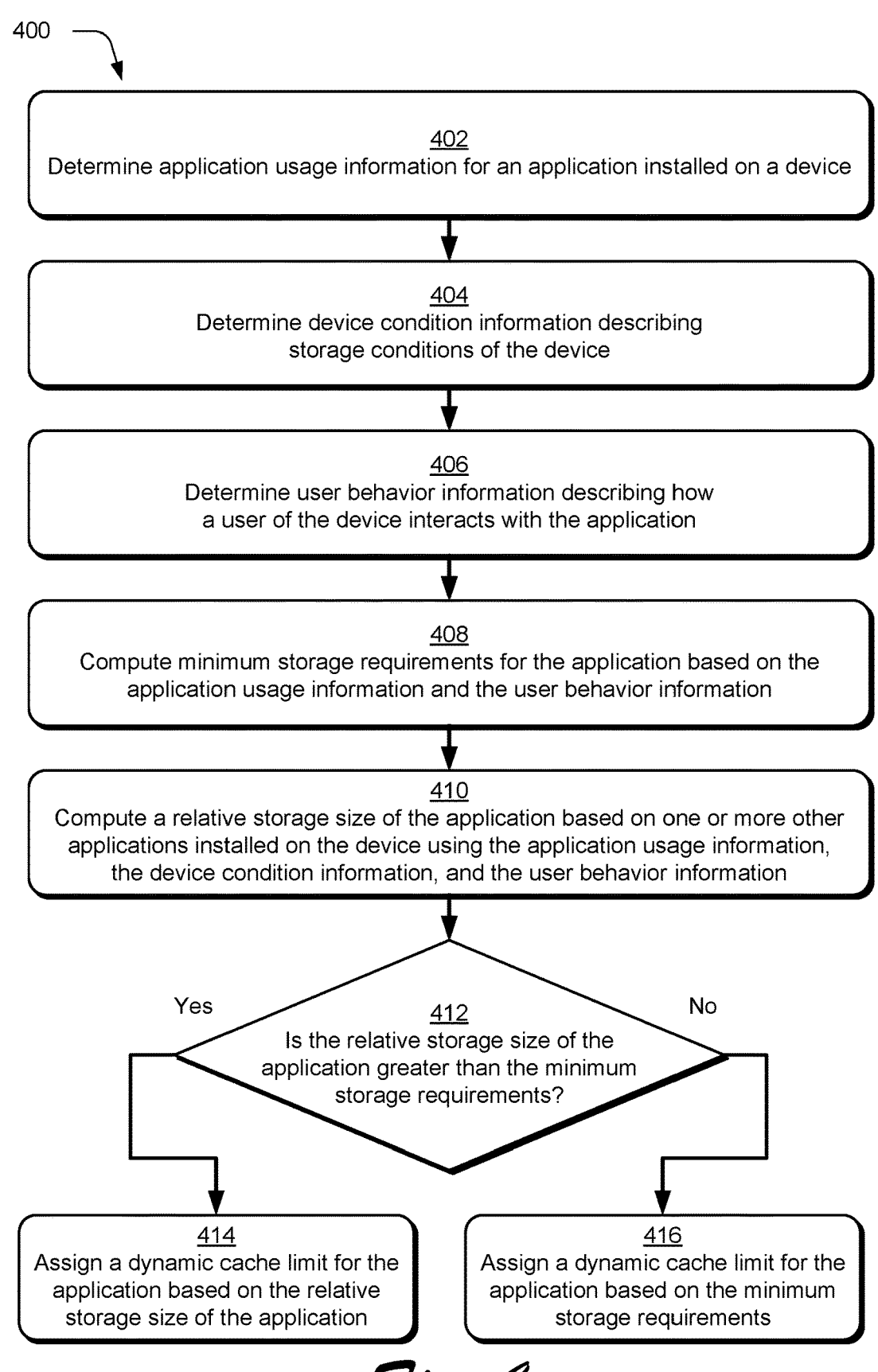

<u>402</u>
Determine application usage information for an application installed on a device <u>404</u>
Determine device condition information describing
storage conditions of the device <u>406</u>
Determine user behavior information describing how
a user of the device interacts with the application <u>408</u>
Compute minimum storage requirements for the application based on the
application usage information and the user behavior information <u>410</u>
Compute a relative storage size of the application based on one or more other
applications installed on the device using the application usage information,
the device condition information, and the user behavior information Yes <u>412</u>
Is the relative storage size of the
application greater than the minimum
storage requirements?

No

<u>414</u>
Assign a dynamic cache limit for the
application based on the relative
storage size of the application <u>416</u>
Assign a dynamic cache limit for the
application based on the minimum
storage requirements

Platform 616

Resources 618

Cloud
614

Computing Device 602

Processing System 604

Hardware Elements 610

Computer-readable Media 606

Memory/ Storage 612

I/O Interfaces 608

Storage Management System 122

DYNAMIC APPLICATION STORAGE ALLOCATION

BACKGROUND

Software applications, commonly referred to as "apps," are computer programs designed to assist in performance of an activity using a computing device. With advances in computing device technology, an increasingly diverse range of apps are implemented to create, display, modify, manipulate, share, and otherwise interact with digital content. Because applications are designed to perform a particular task or range of tasks, users often install multiple different applications on a computing device so that the computing device is useable to perform a range of different tasks. In many implementations, an application installed on a computing device requires that some computing device storage be made available to maintain application files, digital content accessed by the application, and other data for the application to run properly. However, computing devices have limited available storage space and it remains a challenge to allocate data storage among different applications.

SUMMARY

A storage management system is described that calculates a dynamic cache limit for a computing device application, where the dynamic cache limit defines an amount of local computing device storage that the application is permitted to consume. In implementations, the storage management system calculates dynamic cache limits on an application-specific basis, such that a dynamic cache limit for one application executing on a computing device is different than a dynamic cache limit for the same application executing on a different computing device, different than a dynamic cache limit for another application executing on the computing device, and so forth.

The storage management system is configured to calculate a dynamic cache limit for an application automatically and independent of (e.g., without) user input, based on usage of the application at a computing device, conditions of the computing device, or a combination thereof. Example parameters considered in computing the dynamic cache limit include usage frequency of the application, minimum data retention requirements for the application, available computing device storage, a storage consumption rate of the application, storage consumption by the application relative to at least one other application, size of digital content created or consumed by the application, data download frequency, frequently used digital content, and so forth.

The storage management system is configured to periodically update the dynamic cache limit for an application, such as once during a session when the application is executing on a computing device, multiple times during a session, and so forth. The dynamic cache limit is enforced to prevent an application from consuming more computing device storage than permitted by the dynamic cache limit. Upon identifying that an application is consuming more device storage than permitted by the dynamic cache limit, at least a portion of application data is evicted from the device storage.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIG. 4 is a flow diagram depicting a procedure in an example implementation of computing a dynamic cache limit for a computing device application.

DETAILED DESCRIPTION

Figure 1:
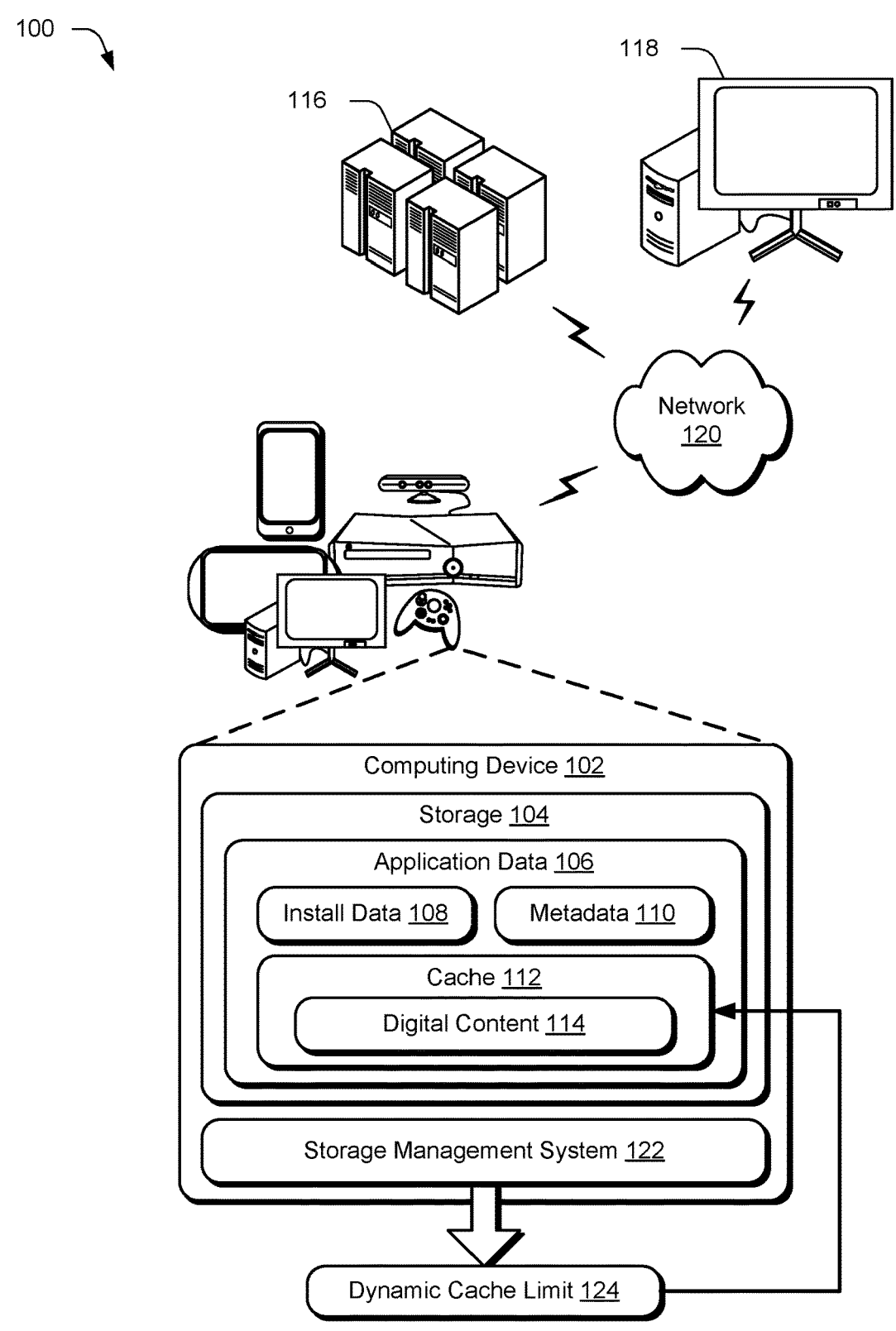
FIG. 1 is an illustration of a digital medium environment in an example implementation that is operable to employ a storage management system for generating a dynamic cache limit for a computing device application.

With advances in computing device technology, an increasingly diverse range of computer software applications are offered for installation on computing devices, thus providing computing devices with specialized tools to perform various tasks. In order to execute an application, a computing device is typically required to allocate a certain amount of storage space for maintaining digital information that represents underlying code used by the computing device to run the application, digital content created or accessed by the application, user settings or preferences, and so forth. A minimum amount of local device storage required by an application is typically referred to as the application's "install size," which is expressed in some implementations as a number of bytes required to install the application on the device.

After installation, applications often consume additional storage space on a computing device, where the additional storage space is used to maintain data representing digital content (e.g., documents, images, etc.) that are created, downloaded, or otherwise interacted with via the application on the computing device. For example, upon downloading an application to a computing device with an installation size of 313 MBs, the application occupies 313 MBs of storage on the computing device. In an example implementation where the application is used to create digital content, the application consumes additional storage on the computing device as digital content is created. For instance, when the application is used to create 433 MBs of digital content (e.g., documents), the overall storage space for the application becomes 746 MBs on the computing device.

In addition to local digital content (e.g., digital content created on, or accessed from, storage of a computing device running the application), many applications leverage digital content stored at a location remote from a computing device executing the application. For instance, maintaining digital content accessed by an application on a remote server enables different computing devices to collaboratively interact with the same digital content (e.g., to enable collaborative document editing by different computing devices). In implementations where digital content or data is accessed by an application from a remote storage location, many applications are designed to download digital content form the remote storage location and store a copy of the retrieved content locally at a computing device executing the application.

By storing a local copy of digital content, the digital content is readily available for consumption by the application, even when the computing device running the application does not have access to a network connection that couples the computing device to the remote storage location. As another advantage, storing local copies of digital content reduces an amount of data transmitted between a server and a computing device running the application, which further reduces computing device power consumption. To store local copies of digital content, an application implements a client-side cache, which is storage space on a computing device that is used to maintain digital content retrieved from a remote storage location.

While leveraging client-side caches are useful to a range of different applications, many computing devices have limited data storage capacity relative to remote data storage locations such as cloud servers. Accordingly, because copies of all digital content stored at a remote storage location cannot be stored locally at a computing device, applications are designed to flush, or evict, old digital content from local cache storage to make room for newer digital content. One conventional approach to allocating local computing device storage among different applications is to assign static storage limits to different applications, where application data is purged from a cache when data stored in the cache approaches or exceeds the static threshold. However, while these static thresholds are acceptable for some use-case scenarios, they are not suitable for other use-case scenarios. For instance, a static threshold for one computing device that infrequently uses an application may be unduly restrictive for another computing device that frequently uses the same application. As a specific example, the device that more frequently uses the application is regularly forced to purge digital content from a cache to make room for new data, then retrieve the digital content from a remote source when the application is again used to access the digital content.

As another option to application storage management, some conventional approaches enable a computing device user to manually configure (e.g., define) an application's cache size. As yet another option, some conventional application designs provide controls that enable a user to manually evict all, or a portion, of digital content maintained in local storage for a given application. However, these conventional approaches are suboptimal and require significant user intervention. Consequently, conventional approaches to managing local device storage for an application often waste significant network and computational resources, require significant user intervention to manage, and introduce latency into application processes.

To address these conventional shortcomings, a storage management system is described that computes a dynamic cache limit for an application executing on a computing device. In implementations, the storage management system is configured to compute the dynamic cache limit prior to launch of an application, upon launch of the application, during execution of the application, after executing the application, or combinations thereof. The dynamic cache limit computed by the storage management system is used by the computing device running (e.g., executing) the application to limit an amount of data storage local to the device that is occupied by the application.

For instance, the dynamic cache limit specifies a threshold amount of data that the application is permitted to maintain in storage local to a computing device on which the application is installed. In a scenario where an application stores an amount of digital content or other data in local storage of a computing device (e.g., a cache) that satisfies (e.g., is greater than or equal to) the dynamic cache limit, the computing device evicts at least a portion of data from the local storage. In this manner, the dynamic cache limit is calculated on an application-specific basis, such that different applications can be assigned different dynamic cache limits, which fairly allocates local device storage among different computing device applications.

The storage management system is configured to calculate the dynamic cache limit for an application based on various different parameters, such as parameters describing application usage information, device condition information, and user behavior information. For instance, the storage management system calculates a dynamic cache limit for an application based on data describing how frequently the application is used by a computing device, minimum data storage requirements for the application, and so forth. The storage management system is further configured to calculate the dynamic cache limit based on information describing available storage of the computing device running the application, a storage consumption rate of the application, relative storage consumption of the application to one or more other applications running on the device, and so forth. Additionally, the storage management system is configured to calculate the dynamic cache limit based on information describing how a particular user utilizes the application, such as size information for data or digital content used by the application, frequently used digital content, data download frequency, and so forth.

In this manner, the storage management system is configured to dynamically update a threshold value that limits an amount of data a given application is permitted to maintain in local storage of a computing device. In some implementations, the storage management system computes this threshold value defined by the dynamic cache limit on a per-session basis, such that the threshold value is updated each time an application is opened and applied (e.g., enforced) until a session end (e.g., until the application is closed or until a threshold period of application inactivity). The techniques described herein thus advantageously optimize application storage consumption for any type of device executing the application and for devices running any number of other applications. Further, by continuously updating the dynamic cache limit, the techniques described herein avoid user intervention required by, and latency inherent in, applications that rely on conventional approaches for allocating local computing device storage, which are unable to account for user behavior in interacting with an application or conditions of a device running the application.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

5

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud," as described in further detail below with respect to FIG. 6.

The computing device 102 is illustrated as including storage 104. The storage 104 is representative of one or more hardware storage components of the computing device 102 that are configured to maintain data involved in operation of the computing device 102, an operating system of the computing device 102, one or more applications executed by the computing device 102, and so forth. The storage 104 is thus representative of at least one computer-readable storage medium, as described in further detail below with respect to FIG. 6.

The storage 104 is configured to maintain application data 106 for at least one application installed on the computing device 102, running or executing on the computing device 102, running or executing on a computing device other than the computing device 102, or combinations thereof. Application data 106 for an application is representative of install data 108 for the application, metadata 110 associated with the application, as well as data maintained in a cache 112 or other local storage of a device implementing the application (e.g., in a cache 112 of the computing device 102). As described herein, install data 108 for an application refers to data that is associated with an application upon installation at, or execution by, the computing device 102. In this manner, the install data 108 is representative of one or more files used to install the application on the computing device 102, application binary (e.g., code) executed by the computing device 102 to run the application, information describing functionality of the application (e.g., a user manual, tutorial data, help files, etc.), combinations thereof, and so forth.

As described herein, metadata 110 is representative of data describing information for an application that is particular to use of the application on a computing device (e.g., information that pertains to use of the application on the computing device 102). In this manner, in some implementations metadata 110 for an instance of an application installed on a first computing device is configured to differ from another instance of the same application installed on a second computing device. For instance, in in some implementations metadata 110 represents user profile information for one or more users of the application that are associated with the computing device 102 (e.g., a user identifier, user preferences defined during one or more previous sessions with the application at the computing device 102, a different computing device, or combinations thereof, and so forth).

Generally, the install data 108 and the metadata 110 are representative of data associated with an application that is maintained in storage 104 of the computing device 102 across different sessions. For instance, the install data 108 is representative of application data 106 that is maintained in storage 104 of the computing device 102 until an application is removed (e.g., uninstalled) from the computing device 102. The metadata 110 is similarly persisted in storage 104 of the computing device 102 in order to maintain user preferences, settings, and other configurable aspects of an application that were defined in a previous session upon commencement of another session (e.g., upon opening the application) at the computing device 102. In this manner, in some implementations the install data 108 and the metadata 110 for an application are collectively representative of digital content for an application that is stored locally on the computing device 102 and is not stored on any one or more storage devices or systems other than the computing device 102.

In addition to the install data 108 and the metadata 110, the application data 106 is representative of data associated with an application stored in at least one cache 112 of the computing device 102. In the illustrated example of FIG. 1, data stored in the cache 112 is represented as digital content 114. The digital content 114 is representative of data that is generated at, downloaded to, or accessed by the computing device 102 as part of executing an application. For instance, in an example implementation where the application data 106 is representative of data for a digital image editing application, digital content 114 is representative of a digital image that is created or modified at the computing device 102. As a specific example, the digital content 114 is representative of a digital image accessed from local storage (e.g., storage 104) of the computing device 102.

Alternatively or additionally, the digital content 114 is representative of data that is obtained from one or more data sources other than the computing device 102. For instance, in some implementations the digital content 114 is representative of data obtained from a content provider 116 (e.g., a server, a cloud database, and the like) configured to store data remotely from the computing device 102. Alternatively or additionally, the digital content 114 is representative of data obtained from at least one computing device 118 that is different from the computing device 102. In implementations, digital content 114 is obtained by the computing device 102 from one or more remote sources via a network 120 that communicatively couples the computing device 102 to the content provider 116, the at least one computing device 118, and other network-based resources. The network 120 is thus representative of a wired connection, a wireless connection, or a combination thereof, that communicatively couples the computing device 102 to at least one different device, such as other computing devices, one or more servers, and so forth.

Continuing the previous example, in an implementation where the digital content 114 is obtained by the computing device 102 during execution of a digital image editing application, the digital content 114 is representative of a digital image obtained from the content provider 116, the at least one computing device 118, and/or another source other than the computing device 102. For instance, continuing the example where the application data 106 is for a digital image editing application, the digital content 114 is representative of a digital image together with data generated as a result of application operations such as commenting operations, editing operations, content sharing operations, combinations thereof, and so forth.

In implementations where the digital content 114 represents data obtained from a storage location other than the storage 104, the computing device 102 leverages the cache 112 to maintain a local copy of the digital content 114 for access by an application during execution of the application. By maintaining a local copy of the digital content 114 in the cache 112, the computing device 102 mitigates traffic on the network 120 that would otherwise be required to communicate a result of each operation (e.g., a result of every image editing operation) to a storage location that hosts the digital content (e.g., avoids communicating a result of each image editing operation via the network 120 to the computing device 118). Rather, the computing device 102 is configured to locally update the digital content 114 maintained in the cache 112 to reflect a result of one or more application operations performed at the computing device 102.

In some implementations, the computing device 102 periodically updates the copy of digital content 114 stored in the cache 112, periodically updates a source from which the digital content 114 was obtained, or combinations thereof. For instance, in an example implementation where the computing device 102 is executing a collaborative image editing application, the computing device 102 is configured to synchronize the copy of digital content 114 maintained in the cache 112 with one or more other copies of the digital content 114 maintained at one or more other computing devices. For instance, the computing device 102 communicates information describing changes made to the digital content 114 locally at the computing device 102 to the content provider 116 to update a controlling version of the digital content 114. Alternatively or additionally, the computing device 102 updates the copy of the digital content 114 maintained in the cache 112 with one or more changes received from another device collaborating on the digital content 114 (e.g., one or more changes made at the computing device 118).

The computing device 102 is further illustrated as including a storage management system 122. The storage management system 122 represents functionality of the computing device 102 to monitor use of the cache 112 by one or more applications running on the computing device 102 and regulate an amount of storage 104 that an individual application is permitted to consume by storing digital content 114 in the cache 112. In contrast to conventional systems that designate a static cache limit for an application, the storage management system 122 is configured to compute a dynamic cache limit 124 for an application based on different parameters, such as parameters describing usage of the application at the computing device 102, information describing a current condition of the computing device 102, information describing behavior of one or more users of the application at the computing device 102, and combinations thereof.

The dynamic cache limit 124 is representative of a value that specifies a threshold amount of data that an application is permitted to maintain in storage local to the computing device 102 (e.g., a maximum amount of storage 104 that the application is permitted to occupy). As described herein, the storage management system 122 is configured to calculate the dynamic cache limit 124 on an application-specific basis, such that in various implementations different applications are assigned different dynamic cache limits. Using the techniques described herein, the storage management system 122 is configured to fairly allocate storage 104 among different applications being run or executed by the computing device 102.

The storage management system 122 is further representative of functionality of the computing device 102 to enforce the dynamic cache limit 124 for a given application (e.g., apply a data storage threshold described by the dynamic cache limit 124 for one or more sessions of the given application). For instance, the storage management system 122 is configured to monitor an amount of storage 104 used (e.g., consumed) by an application, relative to the dynamic cache limit 124 for the application. In response to identifying that an application stores an amount of application data 106 that satisfies (e.g., is greater than or equal to) the dynamic cache limit 124 for the application, the storage management system 122 causes the computing device 102 to evict at least a portion of the digital content 114 from the cache 112.

In implementations, the storage management system 122 causes the computing device 102 to evict (e.g., flush, remove, overwrite, etc.) an amount of digital content 114 from the cache 112 based on information describing when the digital content 114 was last accessed by the application, such that more recently accessed digital content 114 is maintained in the cache 112 while less recently accessed digital content 114 is removed from the cache 112, or vice versa. Alternatively or additionally, the storage management system 122 causes the computing device 102 to evict digital content 114 from the cache 112 based on an access frequency associated with an item of digital content 114. In this manner, the storage management system 122 causes the computing device 102 to evict less frequently accessed digital content 114 in favor of more frequently accessed digital content 114, or vice versa.

Alternatively or additionally, the storage management system 122 causes the computing device 102 to evict digital content 114 from the cache 112 based on a size of the digital content 114. For example, the storage management system 122 causes the computing device 102 to evict as few items of digital content 114 as possible such that an amount of application data 106 consumed by the application no longer satisfies the dynamic cache limit 124, or vice versa. As another example, the storage management system 122 causes the computing device 102 to maintain larger items of digital content 114 in the cache 112 in favor of smaller items of digital content 114, or vice versa. Alternatively or additionally, the storage management system 122 is configured to evict digital content 114 from the cache 112 based on parameters defined by an application for which the dynamic cache limit 124 is computed. In this manner, the storage management system 122 is representative of functionality that both generates and enforces a dynamic cache limit 124 for an individual application executed by, or running on, the computing device 102.

Having considered an example digital medium environment, consider now a discussion of an example system useable to generate a dynamic cache limit for a computing device application.

Storage Management System

Figure 2:
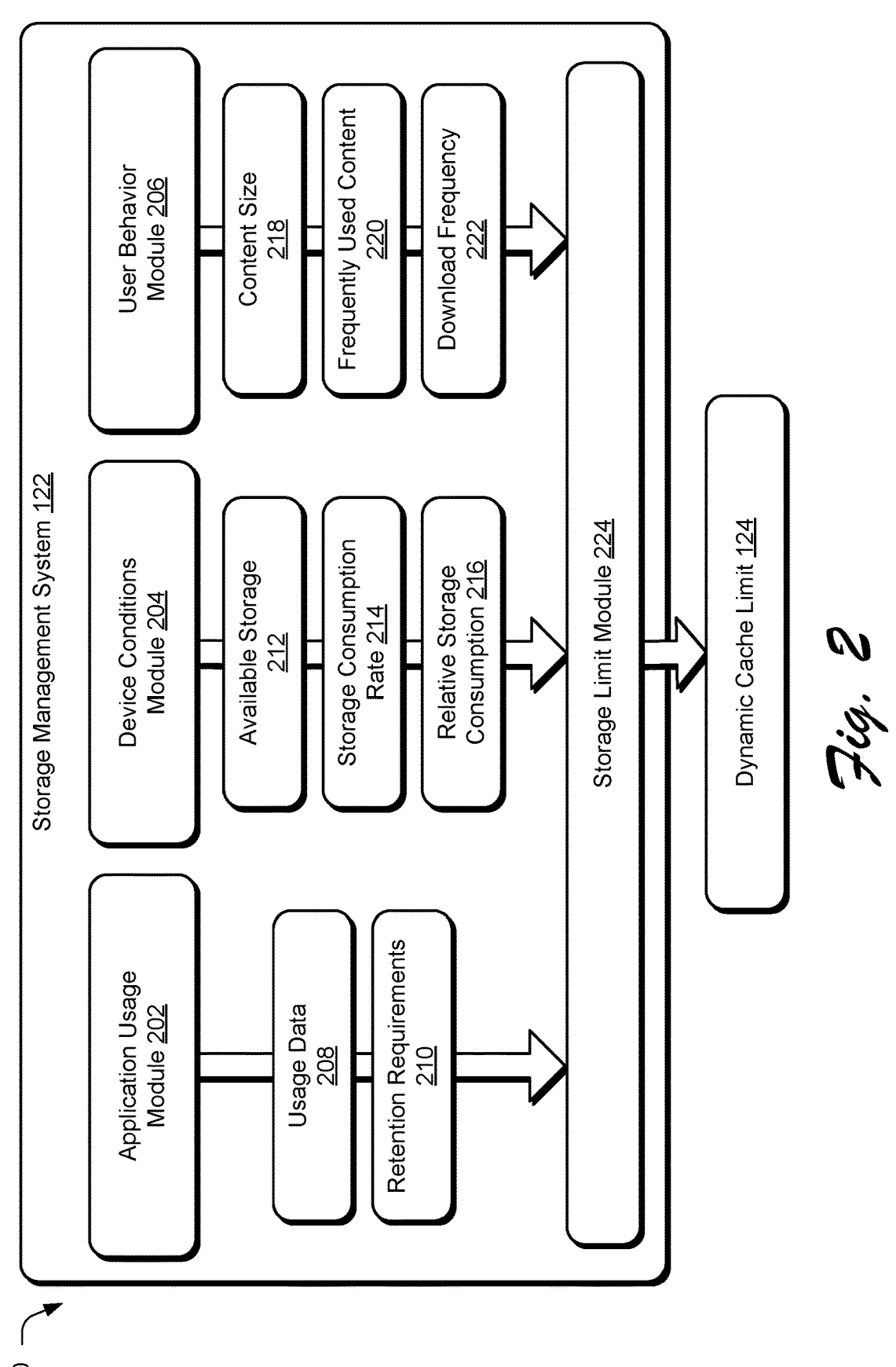
FIG. 2 depicts a digital medium environment showing operation of the storage management system of FIG. 1 generating a dynamic cache limit for a computing device application.

FIG. 2 depicts a digital medium environment 200 showing operation of the storage management system 122 generating a dynamic cache limit 124 for an application.

As illustrated in FIG. 2, the storage management system 122 computes a dynamic cache limit 124 for an application executing or running on a computing device, such as computing device 102. To do so, the storage management system

122 implements an application usage module 202, a device conditions module 204, and a user behavior module 206.

The application usage module 202 represents functionality of the storage management system 122 to identify information describing usage of a given application on a computing device. For instance, as depicted in FIG. 2, the application usage module 202 is configured to identify usage data 208 for the given application. The usage data 208 represents information describing a frequency at which the given application is used (e.g., executed, run, etc.) at the computing device. For instance, the usage data 208 describes a history usage of the given application at the computing device (e.g., a log of timestamps describing start and end times for each session during which the application is used at the computing device). Alternatively or additionally, the usage data 208 specifies a time (e.g., a date and/or time on a given date) when the application was last used (e.g., most recently used prior to a current time) at the computing device.

In implementations, the application usage module 202 determines the usage data 208 using information maintained in storage 104 of the computing device 102, such as data describing one or more prior sessions during which an application was run on computing device 102. Alternatively or additionally, the application usage module 202 determines the usage data 208 using information maintained via one or more storage devices implemented remotely from the computing device 102, such as from the content provider 116, the at least one computing device 118, combinations thereof, and so forth. As a specific example, the content provider 116 represents a developing entity of an application run on computing device 102 that maintains data describing use of the application by various devices and the application usage module 202 determines the usage data 208 based on data maintained by the content provider 116.

Alternatively or additionally, the usage data 208 describes a generalized usage rate for the application. For instance, in an example implementation where an application is typically used at least once within a 24-hour period, the usage data 208 indicates daily usage of the application. As another example, if historical sessions for the application occur within seven days, the usage data 208 indicates weekly usage of the application. As yet another example, if historical sessions for the application occur within 30 days, the usage data 208 indicates monthly usage of the application. The usage data 208 is thus representative of information describing a history of use of a given application on a given computing device, and is configurable in various granularities of detail in accordance with the techniques described herein.

The application usage module 202 is further configured to identify one or more retention requirements 210 associated with an application. As described herein, retention requirements 210 for an application refer to a minimum amount of data defined by the application for continued storage on the computing device executing the application. For instance, the retention requirements 210 are representative of a minimum number of documents, a minimum size of digital content 114, an application-defined benchmark metric designated by the application as required for storage on a computing device, combinations thereof, and so forth.

As a specific example, in some implementations the retention requirements 210 identify application data 106 such as install data 108 and metadata 110 that are to be maintained in storage 104 of the computing device 102 across multiple sessions in which an application is running on the computing device 102. Alternatively or additionally, the retention requirements 210 define a minimum number of digital content 114 items to be maintained in the cache 112 during a session in which the application is running on the computing device 102, across two or more sessions, and so forth. The retention requirements 210 are thus configurable in any suitable manner and defined on an application-specific basis (e.g., defined by a developer of an application).

In implementations, the application usage module 202 determines retention requirements 210 using information maintained in storage 104 of the computing device 102. As a specific example, the install data 108 for an application specifies a minimum number of documents to be retained in local storage of a computing device executing the application and the application usage module 202 determines the retention requirements 210 using the install data 108. Alternatively or additionally, the application usage module 202 determines the retention requirements 210 using information maintained via one or more storage devices implemented remotely from the computing device 102, such as from the content provider 116, the at least one computing device 118, combinations thereof, and so forth. As a specific example, the content provider 116 represents a developing entity of an application run on computing device 102 that maintains data defining a minimum number or size of digital content items to be maintained in local storage of a computing device running the application and the application usage module 202 determines the retention requirements based on data maintained by the content provider 116.

The device conditions module 204 represents functionality of the storage management system 122 to identify information describing a current condition of a computing device at which the given application is being used (e.g., computing device 102). For instance, in the illustrated example of FIG. 2, the device conditions module 204 is configured to identify available storage 212 of the computing device at which the given application is being used. The available storage 212 is thus representative of information describing an amount of the storage 104 that is available at the computing device 102 at a given time. For instance, the available storage 212 describes an overall capacity of the storage 104, an amount of free space in the storage 104, or a combination thereof.

In addition to identifying available storage 212 of the computing device, the device conditions module 204 is configured to identify a storage consumption rate 214 for the computing device. The storage consumption rate 214 is representative of information describing a rate at which the storage 104 of the computing device 102 is being filled. In implementations, the storage consumption rate 214 is expressed as a quantity of storage relative to time (e.g., bits per second, megabits per minute, etc.). As described in further detail below, the storage consumption rate 214 is useable by the storage management system 122 to adapt the dynamic cache limit 124 based on a current storage consumption load. For example, in an implementation where the storage consumption rate 214 indicates that storage 104 is being consumed at a higher pace, the storage management system 122 is configured to identify that less cache 112 space should be consumed and generate the dynamic cache limit 124 accordingly. Conversely, in an example implementation where the storage consumption rate 214 indicates that storage 104 is being consumed at a relatively lower pace, the storage management system 122 identifies that additional cache 112 is available for consumption and generates the dynamic cache limit 124 accordingly.

The device conditions module 204 is further configured to identify a relative storage consumption 216 associated with the application for which the dynamic cache limit 124 is computed. The relative storage consumption 216 is thus representative of information describing an amount of storage 104 being used by the application for which the dynamic cache limit 124 is computed, relative to one or more other applications consuming storage 104 of the computing device 102. For instance, in implementations the relative storage consumption 216 includes information describing an amount of storage 104 occupied by each application running or executed on the computing device 102.

Alternatively or additionally, the relative storage consumption 216 includes information describing a storage consumption ranking of the application for which the dynamic cache limit 124 is computed relative to other applications used at the computing device 102. In this manner, the relative storage consumption 216 is representative of any suitable information that describes an amount of storage 104 consumed by an application in relation to an amount of storage 104 consumed by at least one other application. As described in further detail below, the relative storage consumption 216 is useable by the storage management system 122 to ensure that a disproportionate amount of storage 104 is not occupied by an application for which the dynamic cache limit 124 is computed.

The user behavior module 206 represents functionality of the storage management system 122 to identify information describing a behavior of one or more users of the application for which the dynamic cache limit 124 is computed. For instance, in the illustrated example of FIG. 2, the user behavior module 206 is configured to identify a content size 218 of digital content (e.g., digital content 114) associated with the application for which the dynamic cache limit 124 is computed. In implementations, the content size 218 is representative of information describing a size of each digital content item created, downloaded, edited, or otherwise accessed by a user via the application for which the dynamic cache limit 124 is generated. Alternatively or additionally, the content size 218 is representative of information describing an average size of digital content 114 associated with the application.

In some implementations, the content size 218 is output by the user behavior module 206 as representative of a most recent n instances of digital content 114 associated with an application (e.g., an average size of the last n documents that were created, opened, edited, and so forth, via the application). In implementations where the content size 218 is representative of information pertaining to a most recent n instances of digital content 114, n is configurable as any integer.

The user behavior module 206 is further configured to identify information describing frequently used content 220 associated with the application or which the dynamic cache limit 124 is calculated. In implementations, the frequently used content 220 is information describing at least one digital content 114 item that is accessed, edited, downloaded, or otherwise used by the application at a threshold interval. For instance, in some implementations digital content 114 items that are used at least one a day are identified as frequently used items for the application. Alternatively, in some implementations digital content 114 items that are used at least once a week are identified as frequently used items for the application.

Alternatively or additionally, in some implementations digital content 114 items that are used more frequently than a threshold amount of other digital content 114 items are identified as frequently used content 220 (e.g., items of digital content 114 that are used more often than 70% of all digital content 114 used by the application during a threshold period). As a specific example, in a scenario where the user behavior module 206 identifies that ten different documents were opened, edited, created, or otherwise accessed by an application during a threshold period (e.g., an hour, a day, a week, a month, etc.), the user behavior module 206 identifies the three most frequently used documents from the ten different documents as the frequently used content 220 for the application. The frequently used content 220 is identifiable by the user behavior module 206 using any suitable metric and is not so limited to the examples described herein. Rather, the examples described herein are simply representative of information that the user behavior module 206 considers in identifying frequently used content 220 for an application.

The user behavior module 206 is further configured to identify a download frequency 222 of the application for which the dynamic cache limit 124 is computed. The download frequency 222 is representative of information describing a rate at which the application retrieves digital content 114 from a source other than storage 104, such as from content provider 116, from at least one computing device 118 other than the computing device 102, and so forth. In implementations, the download frequency 222 includes information describing a temporal interval at which the application downloads data from a source other than storage 104 of the computing device 102 (e.g., a times per session, every b minutes, and so forth, where a and b represent any suitable values).

The user behavior module 206 is configured to identify the download frequency 222 for an application in a variety of manners, such as by monitoring network requests made by the application at the computing device 102. Alternatively or additionally, the user behavior module 206 determines the download frequency 222 for an application using information maintained via one or more storage devices implemented remotely from the computing device 102, such as from the content provider 116, the at least one computing device 118, combinations thereof, and so forth. As a specific example, the content provider 116 represents a developing entity of an application run on computing device 102 that maintains data defining historical download requests made by the application at computing device 102 and the application usage module 202 determines the download frequency 222 based on data maintained by the content provider 116.

As described in further detail below, the download frequency 222 is useable by the storage management system 122 to identify whether storage allocated by the dynamic cache limit 124 is sufficient to optimize network traffic for the application. For instance, in implementations where the download frequency 222 indicates frequent downloads by the application, the storage management system 122 identifies that insufficient space in the cache 112 is allocated to the application and increases the dynamic cache limit 124 accordingly. In some scenarios, the frequently used content 220 is leveraged together with the download frequency 222, such that the storage management system 122 identifies instances when frequently used digital content is downloaded at a high frequency, which is indicative of insufficient storage 104 being allocated to the application.

Information provided by the application usage module 202, the device conditions module 204, and the user behavior module 206 is then used by a storage limit module 224 of the storage management system 122 to compute the dynamic cache limit 124 for the application.

The storage limit module 224 is configured to calculate the dynamic cache limit 124 for an application based on any one or more of the usage data 208, the retention requirements 210, the available storage 212, the storage consumption rate 214, the relative storage consumption 216, the content size 218, the frequently used content 220, or the download frequency 222.

For instance, in some implementations the storage limit module 224 calculates the dynamic cache limit 124 as the greater value of ms or rs, which are computed respectively according to Equations 1 and 2 below:

$$ms = K \times \frac{\left(\sum_{i=0}^{c} \text{size of recent } c \text{ documents}\right)}{c} \quad \text{(Eq. 1)}$$

$$rs = \max\left(N, \min\left[0.1 \times f, \left(\frac{\Delta f \times 100}{f} \times m\right) \times \right.\right.$$
$$\left.\left. n \times \frac{\left(\sum_{i=0}^{c} \text{size of recent } c \text{ documents}\right)}{c}\right]\right) \quad \text{(Eq. 2)}$$

In Equations 1 and 2, f represents an amount of available storage 212 for the computing device implementing the application for which the dynamic cache limit 124 is calculated. $\Delta f$ is a value that represents a change in available storage 212 between a current time when the dynamic cache limit 124 is calculated and a previous session (e.g., a change in the available storage 212 between a current application session and a last usage of the application as indicated by the usage data 208, as indicated by the storage consumption rate 214).

In Equations 1 and 2, c is an integer that represents a number of digital content 114 items created, downloaded, edited, or otherwise accessed by the application for which the dynamic cache limit 124 is calculated. In some implementations, c is constrained to represent no more than a threshold number of digital content 114 items that were recently created, downloaded, or otherwise accessed by the application. For example, in some implementations c is an integer that represents no more than the ten items of digital content 114 most recently created, downloaded, edited, or otherwise accessed by the application for which the dynamic cache limit 124 is calculated. Thus, $$\frac{\left(\sum_{i=0}^{c} \text{size of recent } c \text{ documents}\right)}{c},$$

as expressed in Equations 1 and 2 is representative of an average size of digital content 114 item recently created, downloaded, edited, or otherwise accessed by the application for which the dynamic cache limit 124 is calculated.

In Equation 1, K is representative of a minimum number of items of digital content 114 to be maintained for the application (e.g., as specified by the retention requirements 210). In this manner, in an example scenario where K=2, the value of ms as computed via Equation 1 is representative of a minimum amount of storage required to store two average sized items of digital content 114 for the application.

In Equation 2, m is a value that represents a frequency with which the application is used at the computing device (e.g., as described by the usage data 208). For instance, in some implementations where the application for which the dynamic cache limit 124 is computed is used at a frequency of monthly or less frequent, m=1. As another example, in implementations where the application is used daily at the computing device, m=1.25. The specific value assigned to m is configurable in any manner without departing from the spirit of the techniques described herein.

In Equation 2, N is a value representing an amount of storage consumed by an application that occupies a greatest amount of storage 104 relative to all applications used by the computing device 102 (e.g., as indicated by the relative storage consumption 216). In some implementations, N represents an amount of storage 104 occupied by the application for which the dynamic cache limit 124 is calculated. Alternatively, in some implementations N represents an amount of storage 104 occupied by an application other than the application for which the dynamic cache limit 124 is calculated.

In Equation 2, n is an integer value representing a maximum number of items of digital content 114 to be maintained in the cache 112. In this manner, n is configurable as any suitable integer greater than or equal to K. In implementations, the storage limit module 224 is configured to select a value for n based on retention requirements 210, content size 218, frequently used content 220, download frequency 222, or combinations thereof. For instance, an instance of an application operating on one computing device that is commonly used to access more items of digital content 114 might be assigned a relatively large value n. Conversely, another instance of the application operating on a different computing device that historically accesses fewer items of digital content 114 might be assigned a relatively small value n.

In this manner, the value of rs as calculated according to Equation 2 represents relative amount of storage consumption for a device that is designed to not exceed an amount of storage consumed by any other application for the device. The storage limit module 224 is thus configured to ensure equal storage access for different computing device applications and allocate additional storage for certain applications in scenarios where application usage information, device condition information, and/or user behavior information indicate appropriate.

The storage limit module 224 is configured to calculate the dynamic cache limit 124 for an application at a variety of times and at various intervals. For instance, in some implementations the storage limit module 224 calculates the dynamic cache limit 124 for an application on a per-session basis, such as at the beginning of a session (e.g., upon opening the application at the computing device 102, in response to activity occurring after a threshold period of inactivity, upon installing the application at the computing device, upon startup of the computing device 102, and so forth).

In implementations, the dynamic cache limit 124 calculated at the beginning of an application session is enforced throughout the session. In some implementations, the dynamic cache limit 124 is calculated at the conclusion of a session (e.g., upon closing the application, after a threshold period of inactivity, upon shutdown of the computing device 102, and so forth) and the dynamic cache limit 124 calculated at the conclusion of the session is enforced for a subsequent session of the application. Alternatively or additionally, the dynamic cache limit 124 is calculated periodically for the application during a session in which the application is operating at the computing device 102. For instance, in some implementations the storage limit module 224 updates the dynamic cache limit 124 in response to receiving information from one or more of the application usage module 202, the device conditions module 204, or the user behavior module 206.

In this manner, the storage limit module 224 is configured to adapt the dynamic cache limit 124 for an application based on a current use of the application, current use of one or more different applications, and a current state of the computing device 102. Advantageously, using the techniques described herein the storage limit module 224 is configured to calculate the dynamic cache limit 124 automatically and independent of user input or intervention. Alternatively, in some implementations the storage limit module 224 is configured to calculate the dynamic cache limit 124 for an application in response to receiving user input requesting that a new storage limit be calculated for an application.

Figure 3:
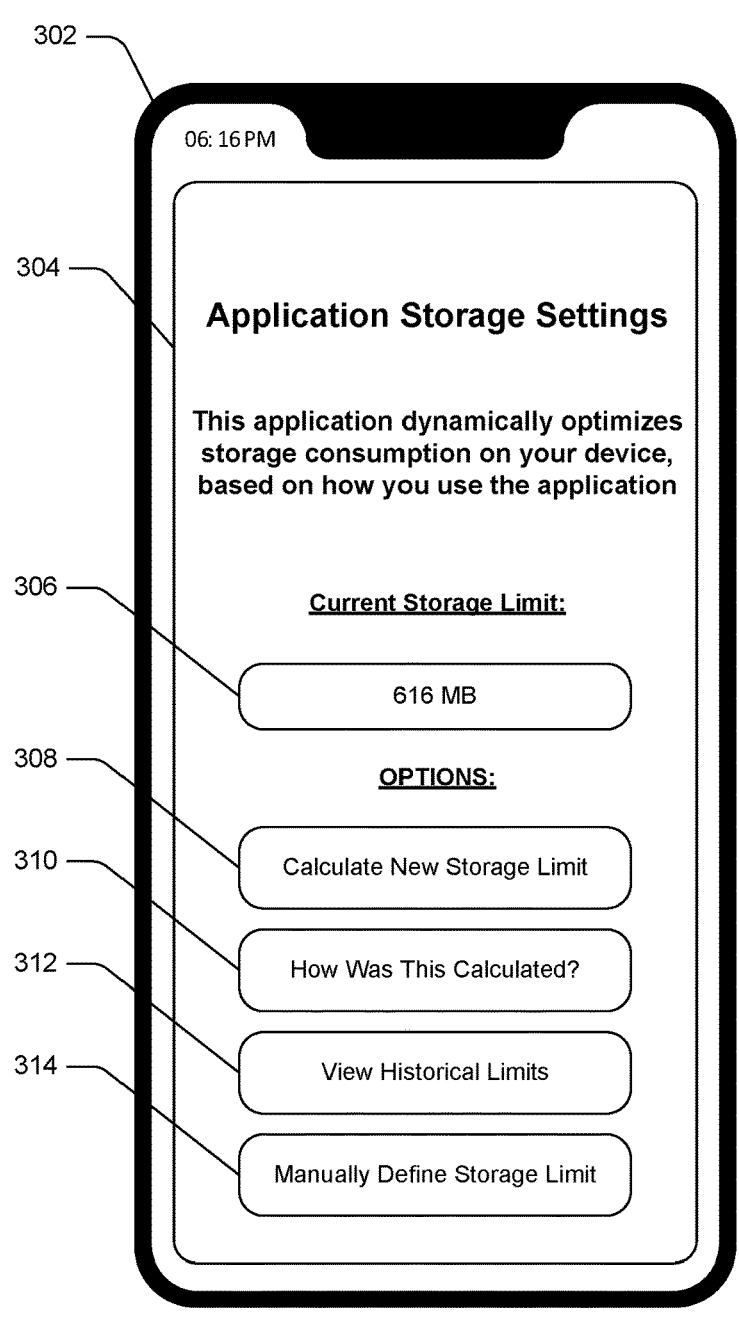
FIG. 3 depicts a digital medium environment depicting an example user interface for the storage management system of FIG. 1.

FIG. 3 depicts a digital medium environment 300 depicting an example user interface for the storage management system 122.

In the illustrated example of FIG. 3, device 302 represents an instance of a computing device running or executing an application for which a dynamic cache limit 124 is computed (e.g., computing device 102). In the illustrated example, device 302 is depicted as outputting a user interface 304 that displays information associated with the storage management system 122. Specifically, user interface 304 is depicted as displaying a current storage limit 306 for an application, where the current storage limit 306 describes a value of the dynamic cache limit 124 computed for the application.

The user interface 304 is further illustrated as including a plurality of selectable controls. For instance, user interface 304 includes control 308, which is selectable (e.g., via user input) to cause the storage management system 122 to compute (e.g., recalculate) a dynamic cache limit 124 for an application associated with the current storage limit 306 displayed in the user interface 304. The user interface 304 is further depicted as including a control 310, which is selectable to cause display of information describing how the current storage limit 306 was computed.

In implementations, the storage management system 122 is configured to update the user interface 304 in response to selection of the control 310 to display information describing one or more parameters involved in computing the dynamic cache limit 124. For instance, the storage management system 122 updates the user interface 304 to display one or more of usage data 208, retention requirements 210, available storage 212, storage consumption rate 214, relative storage consumption 216, content size 218, frequently used content 220, or download frequency 222 that influenced computation of the dynamic cache limit 124. Alternatively or additionally, the storage management system 122 updates the user interface 304 to display one or more algorithms involved in calculating the dynamic cache limit 124 (e.g., Equations 1 and 2 above).

The user interface 304 is further depicted as including control 312, which is selectable to cause display of one or more historical dynamic cache limits 124 calculated for an application (e.g., the application for which the current storage limit 306 is displayed). The user interface 304 is further depicted as including control 314, which is selectable to receive input defining a storage limit for an application (e.g., a storage limit other than the value indicated by the current storage limit 306). In this manner, the storage management system 122 enables a user to manually override the auto-matic dynamic cache limit 124 calculation techniques described herein and customize how an application is restricted from consuming storage 104 (e.g., ranging from prohibiting the application from occupying any of storage 104 to allowing the application to occupy an entirety of the storage 104).

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3.

FIG. 4 is a flow diagram depicting a procedure 400 in an example implementation of computing a dynamic cache limit for a computing device application.

To begin, application usage information for an application installed on a device is determined (block 402). The application usage module 202, for instance, determines information describing usage data 208 and retention requirements 210 associated with an application for which a dynamic cache limit 124 is to be calculated.

Device condition information that describes storage conditions of the device is also determined (block 404). The device conditions module 204, for instance, determines information describing available storage 212, a storage consumption rate 214, and a relative storage consumption 216 of a device, with respect to the application for which a dynamic cache limit 124 is to be calculated.

User behavior information describing how a user of the device interacts with the application is also determined (block 406). The user behavior module 206, for instance, determines information describing a relative storage consumption 216, frequently used content 220, and a download frequency 222 associated with the application for which a dynamic cache limit 124 is to be calculated.

Minimum storage requirements for the application are then computed based on the application usage information and the user behavior information (block 408). The storage management system 122, for instance, computes minimum storage requirements for the application according to Equation 1.

A relative storage size of the application is then computed based on one or more other application installed on the device using the application usage information, the device condition information, and the user behavior information (block 410). The storage management system 122, for instance, computes relative storage space information for the application according to Equation 2.

A determination is then made as to whether the relative storage size of the application is greater than the minimum storage requirements (block 412). In response to identifying that the relative storage size of the application is greater than the minimum storage requirements (e.g., a "Yes" determination at block 412), a dynamic cache limit for the application is assigned based on the relative storage size of the application (block 414). For instance, in response to determining that a value computed according to Equation 2 is greater than a value computed according to Equation 1, the storage management system 122 outputs the value computed according to Equation 2 as the dynamic cache limit 124 for the application.

Alternatively, in response to identifying that the relative storage size of the application is not greater than the minimum storage requirements (e.g., a "No" determination at block 412), a dynamic cache limit for the application is assigned based on the minimum storage requirements (block 416). For instance, in response to determining that a value computed according to Equation 1 is greater than a value computed according to Equation 2, the storage management system 122 outputs the value computed according to Equation 1 as the dynamic cache limit 124 for the application.

Figure 5:
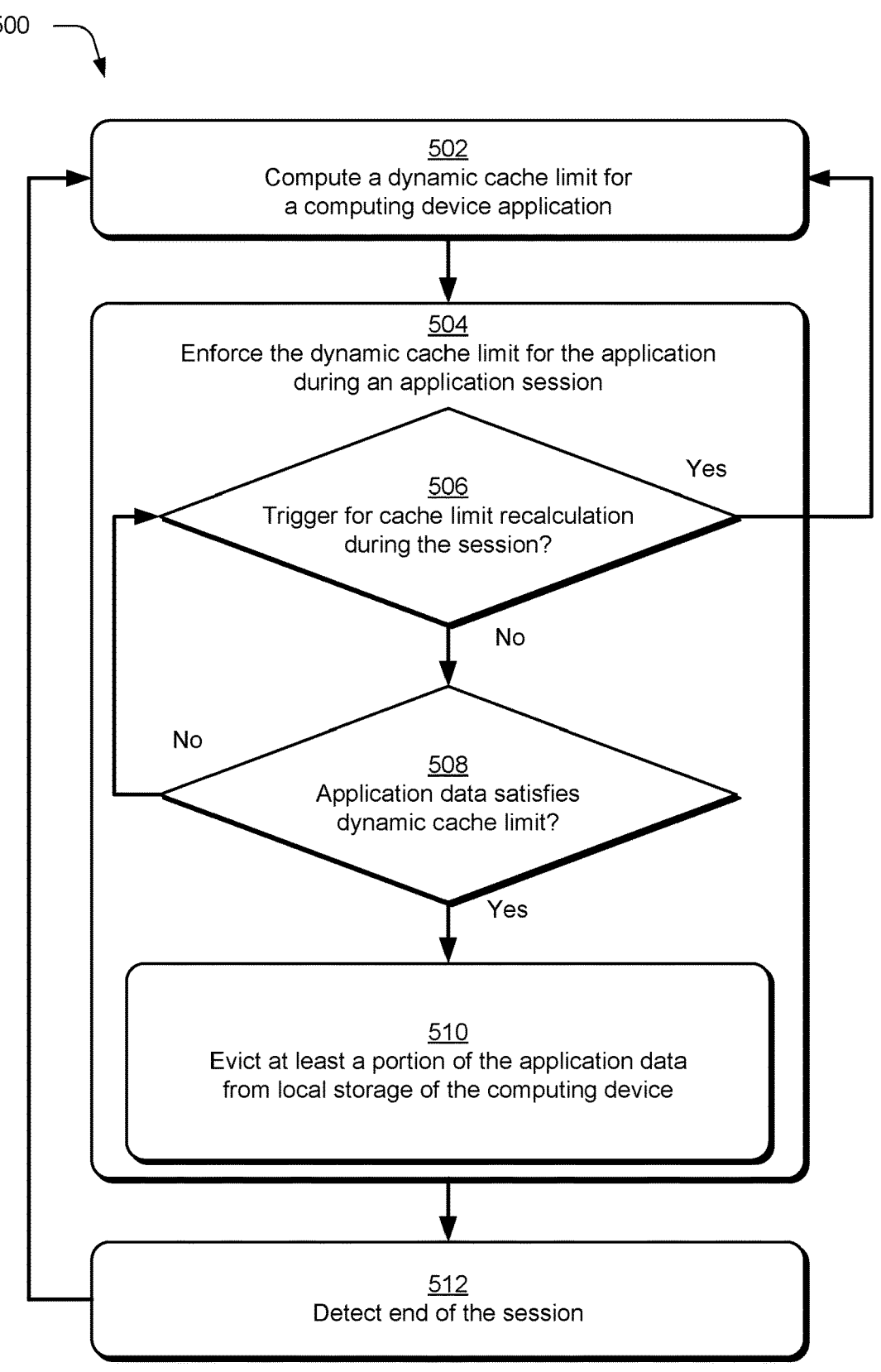
FIG. 5 is a flow diagram depicting a procedure in an example implementation of computing and enforcing a dynamic cache limit for a computing device application.

FIG. 5 is a flow diagram depicting a procedure 500 in an example implementation of computing and enforcing a dynamic cache limit for a computing device application.

To begin, a dynamic cache limit for a computing device application is computed (block 502). The storage management system 122, for instance, computes a dynamic cache limit 124 for an application executing on the computing device 102.

The dynamic cache limit for the application is then enforced during an application session (block 504). As part of enforcing the dynamic cache limit for the application, a determination is made, during the session, as to whether a cache limit recalculation has been triggered (block 506). The storage management system 122, for instance, determines whether a threshold amount of time has elapsed since calculation of the dynamic cache limit 124.

Alternatively or additionally, the storage management system 122 determines whether updated information has been received from one or more of the application usage module 202, the device conditions module 204, or the user behavior module 206. Alternatively or additionally, the storage management system 122 determines whether user input has been received at control 308. In response to detecting that a cache limit recalculation has been triggered (e.g., a "Yes" determination at block 506), operation returns to block 502.

Alternatively, in response to no cache limit recalculation being triggered (e.g., a "No" determination at block 506), a determination is made as to whether application data satisfies the dynamic cache limit (block 508). The storage management system 122, for instance, monitors the application data 106 associated with the application and maintained in storage 104 of the computing device 102. In response to detecting that a size of the application data 106 satisfies (e.g., is greater than or equal to) a threshold storage amount specified by the dynamic cache limit 124 (e.g., a "Yes" determination at block 508) at least a portion of application data is evicted from local storage of the computing device (block 510). The storage management system 122, for instance, causes the computing device 102 to evict at least a portion of the digital content 114 from the cache 112. In doing so, the storage management system 122 ensures that executing the application at the computing device 102 involves preventing the application from consuming an amount of storage defined by the dynamic cache limit 124.

Alternatively, in response to detecting that a size of the application data 106 does not satisfy the dynamic cache limit 124 during the application session (e.g., a "No" determination at block 508), operation returns to block 506. The storage management system 122 continues enforcing the dynamic cache limit 124 until an end of the application session is detected (block 512). The storage management system 122, for instance, detects an end of an application session in response to closing of the application, after a period of inactivity with respect to the application, after shutdown of the computing device 102, and so forth. Upon detecting the end of the session, operation returns to block 502 for calculating a new instance of a dynamic cache limit 124 for a subsequent application session.

Having described example procedures in accordance with one or more implementations, consider now an example system and device to implement the various techniques described herein.

Example System and Device

Figure 6:
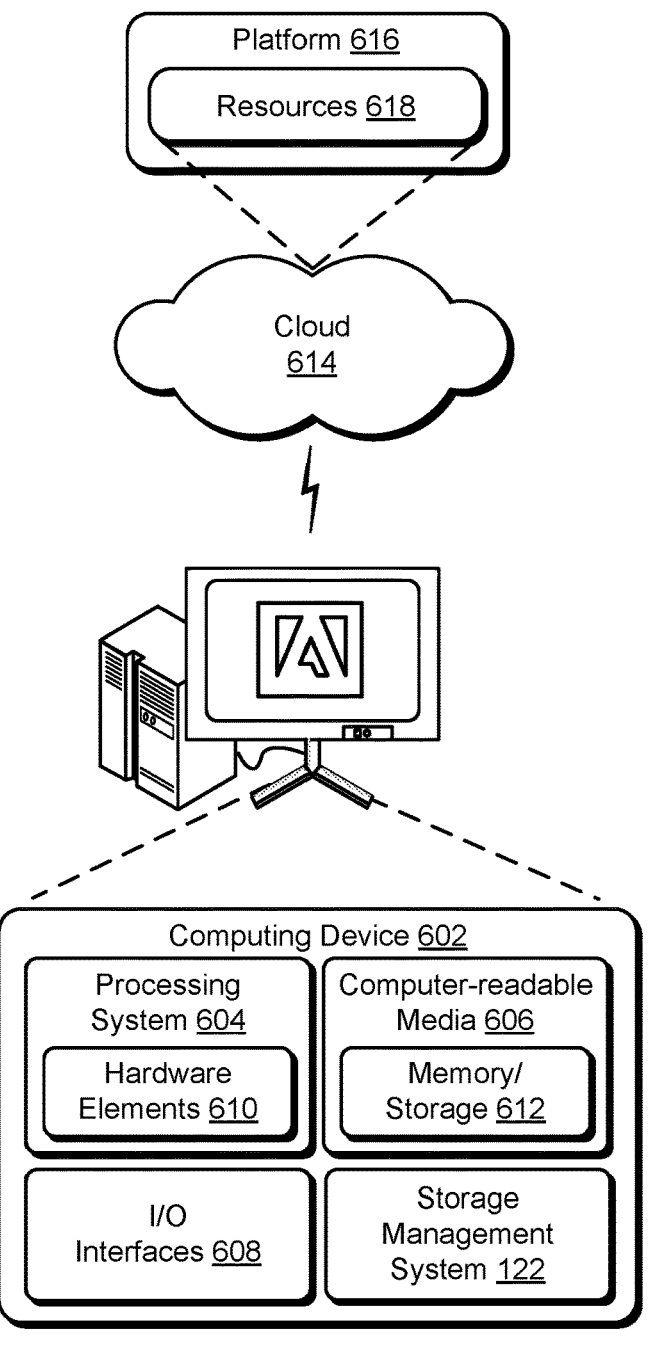
FIG. 6 illustrates an example system including various components of an example device to implement the techniques described with reference to FIGS. 1-5.

FIG. 6 illustrates an example system 600 that includes an example computing device 602, which is representative of one or more computing systems and/or devices that implement the various techniques described herein. This is illustrated through inclusion of the storage management system 122. The computing device 602 is configured, for example, as a service provider server, as a device associated with a client (e.g., a client device), as an on-chip system, and/or as any other suitable computing device or computing system.

The example computing device 602 as illustrated includes a processing system 604, one or more computer-readable media 606, and one or more I/O interface 608 that are communicatively coupled, one to another. Although not shown, the computing device 602 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that are configurable as processors, functional blocks, and so forth. For instance, hardware element 610 is implemented in hardware as an application specific integrated circuit or other logic device formed using one or more semiconductors. The hardware elements 610 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 606 is illustrated as including memory/storage 612. The memory/storage 612 represents memory/storage capacity associated with one or more computer-readable media. The memory/storage 612 is representative of volatile media (such as random-access memory (RAM)) and/or nonvolatile media (such as read only memory (ROM), Flash memory, optical disks, magnetic disks, and so forth). The memory/storage 612 is configured to include fixed media (e.g., RAM, ROM, a fixed hard drive, and so on) as well as removable media (e.g., Flash memory, a removable hard drive, an optical disc, and so forth). In certain implementations, the computer-readable media 606 is configured in a variety of other ways as further described below.

Input/output interface(s) 608 are representative of functionality to allow a user to enter commands and information to computing device 602 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 602, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 610. The computing device 602 is configured to implement instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supported by various configurations of the computing device 602 and are not limited to the specific examples of the techniques described herein. This functionality is further configured to be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 include applications and/or data that is utilized while computer processing is executed on servers that are remote from the computing device 602. Resources 618 also include services provided over the Internet and/or through a subscriber network, such as a cellular or Wi-Fi network.

The platform 616 is configured to abstract resources and functions to connect the computing device 602 with other computing devices. The platform 616 is further configured to abstract scaling of resources to provide a corresponding level of scale to encountered demand for the resources 618 that are implemented via the platform 616. Accordingly, in an interconnected device embodiment, implementation of functionality described herein is configured for distribution throughout the system 600. For example, in some configurations the functionality is implemented in part on the computing device 602 as well as via the platform 616 that abstracts the functionality of the cloud 614.

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:

identifying, by a processing device, a usage frequency of an application on the processing device;

determining, by the processing device, one or more device conditions of the processing device, the one or more device conditions describing at least one of an available amount of storage of the processing device or a rate of storage consumption at the processing device;

identifying, by the processing device, behavior information for the application on the processing device, the behavior information describing at least one of a size of content associated with the application or a rate at which content is downloaded by the application to the processing device;

calculating, by the processing device, a data storage threshold for the application based on the one or more device conditions and at least one of the usage frequency of the application or the behavior information for the application, the data storage threshold specifying a limit of the storage of the processing device that the application is permitted to use; and executing, by the processing device, the application based on the data storage threshold by evicting at least a portion of data associated with the application from the storage of the processing device responsive to satisfaction of the data storage threshold.

2. The method of claim 1, wherein calculating the data storage threshold for the application is performed automatically and independent of user input.

3. The method of claim 1, further comprising calculating a new data storage threshold for the application while executing the application and continuing to execute the application using the new data storage threshold.

4. The method of claim 1, further comprising calculating a different data storage threshold for a different application being executed by the processing device.

5. The method of claim 4, wherein the different data storage threshold specifies a storage size limit that is different from the limit of the storage of the processing device specified by the data storage threshold.

6. The method of claim 1, wherein executing the application is performed during a session at the processing device, the method further comprising:

calculating a new data storage threshold for the application responsive to identifying an end of the session; and applying the new data storage threshold to the application during a subsequent session of executing the application at the processing device.

7. The method of claim 6, wherein identifying the end of the session is performed responsive to the application being closed or responsive to a threshold period of application inactivity.

8. The method of claim 1, further comprising outputting, by the processing device, a user interface that includes at least one of:

an indication of the data storage threshold;

a selectable control to recalculate the data storage threshold;

historical information describing one or more previous data storage thresholds for the application;

a selectable control to modify the data storage threshold; or a description of one or more parameters that influenced calculation of the data storage threshold.

9. A system comprising:

one or more processors; and a computer-readable storage medium storing instructions that are executable by the one or more processors to perform operations comprising:

identifying usage frequency information for an application running on a computing device;

determining one or more device conditions of the computing device, the one or more device conditions describing at least an available amount of storage of the computing device;

identifying behavior information for the application;

calculating a data storage threshold for the application based on the usage frequency information, the one or more device conditions, and the behavior information for the application, the data storage threshold specifying a limit of the storage of the computing device that the application is permitted to use; and enforcing the data storage threshold for the application running on the computing device by evicting at least a portion of data associated with the application from the storage of the computing device responsive to satisfaction of the data storage threshold.

10. The system of claim 9, wherein the one or more device conditions of the computing device further describe a rate of storage consumption at the computing device.

11. The system of claim 9, wherein calculating the data storage threshold for the application is performed automatically and independent of user input.

12. The system of claim 9, wherein the behavior information for the application describes at least one of a size of content associated with the application or a rate at which content is downloaded by the application to the computing device.

13. The system of claim 9, the operations further comprising calculating a new data storage threshold for the application while executing the application and continuing to execute the application using the new data storage threshold.

14. The system of claim 9, the operations further comprising calculating a different data storage threshold for a different application being executed by the computing device.

15. The system of claim 14, wherein the different data storage threshold specifies a storage size limit that is different from the limit of the storage of the computing device specified by the data storage threshold.

16. The system of claim 9, the operations further comprising executing the application during a session at the computing device;

calculating a new data storage threshold for the application responsive to identifying an end of the session; and applying the new data storage threshold to the application during a subsequent session of executing the application at the computing device.

17. The system of claim 16, wherein identifying the end of the session is performed responsive to the application being closed or responsive to a threshold period of application inactivity.

18. The system of claim 9, the operations further comprising outputting, by the computing device, a user interface that includes at least one of:

an indication of the data storage threshold;

a selectable control to recalculate the data storage threshold;

historical information describing one or more previous data storage thresholds for the application;

a selectable control to modify the data storage threshold; or a description of one or more parameters that influenced calculation of the data storage threshold.

19. A computer-readable storage medium storing instructions that are executable by a processing device to perform operations comprising:

identifying a usage frequency of an application on the processing device;

determining one or more device conditions of the processing device, the one or more device conditions describing at least one of an available amount of storage of the processing device or a rate of storage consumption at the processing device;

identifying behavior information for the application on the processing device, the behavior information describing at least one of a size of content associated with the application or a rate at which content is downloaded by the application to the processing device;

calculating a data storage threshold for the application based on the one or more device conditions and at least one of the usage frequency of the application or the behavior information for the application, the data storage threshold specifying a limit of the storage of the processing device that the application is permitted to use; and executing the application based on the data storage threshold by evicting at least a portion of data associated with the application from the storage of the processing device responsive to satisfaction of the data storage threshold.

20. The computer-readable storage medium of claim 19, wherein calculating the data storage threshold for the application is performed automatically and independent of user input.

* * * * *